United States Patent
Mewis

(10) Patent No.: US 8,430,703 B2
(45) Date of Patent: *Apr. 30, 2013

(54) DEVICE FOR REDUCING THE DRIVE POWER REQUIREMENT OF A SHIP

(75) Inventor: Friedrich Mewis, Dresden (DE)

(73) Assignee: becker marine systems GmbH & Co. KG, Hamburg (DE)

( * ) Notice: Subject to any disclaimer, the term of this patent is extended or adjusted under 35 U.S.C. 154(b) by 716 days.

This patent is subject to a terminal disclaimer.

(21) Appl. No.: 12/221,065

(22) Filed: Jul. 30, 2008

(65) Prior Publication Data

US 2009/0084301 A1  Apr. 2, 2009

(30) Foreign Application Priority Data

Mar. 10, 2008 (DE) .................. 20 2008 003 367 U
May 2, 2008 (DE) .................. 20 2008 006 069 U

(51) Int. Cl.
*B63H 1/18* (2006.01)
*B63H 1/28* (2006.01)
*B63H 5/14* (2006.01)
*B63H 5/15* (2006.01)

(52) U.S. Cl.
USPC .................. 440/66; 440/67; 416/189

(58) Field of Classification Search .......... 440/66, 440/67; 416/177, 179–193 R, 247 R, 247 A
See application file for complete search history.

(56) References Cited

U.S. PATENT DOCUMENTS

| | | | |
|---|---|---|---|
| 3,455,268 A | 7/1969 | Gordon | |
| 3,675,424 A | 7/1972 | Oosterveld | |
| 4,288,223 A | 9/1981 | Gonzalez et al. | |
| 4,631,036 A | 12/1986 | Grothues-Spork | |
| 4,694,645 A | 9/1987 | Flyborg et al. | |
| 5,209,642 A * | 5/1993 | Larimer et al. | 416/223 R |
| 5,752,865 A * | 5/1998 | Ishii et al. | 440/67 |
| 5,906,522 A | 5/1999 | Hooper | |
| 6,986,689 B2 | 1/2006 | Norman | |
| 7,229,331 B2 | 6/2007 | Norman et al. | |
| 7,267,589 B2 | 9/2007 | Norman | |
| 8,123,578 B2 * | 2/2012 | Mewis | 440/66 |

FOREIGN PATENT DOCUMENTS

| | | |
|---|---|---|
| DE | 8314111 U1 | 2/1984 |
| DE | 3324753 A1 | 1/1985 |
| DE | 3615619 A1 | 1/1987 |
| DE | 4223570 C1 | 9/1993 |
| EP | 0470339 A1 | 2/1992 |
| EP | 1955944 A1 * | 8/2008 |
| GB | 2119732 A | 11/1983 |
| GB | 2177365 A | 1/1987 |
| JP | 46-006748 A | 2/1971 |
| JP | 47-020860 | 6/1972 |
| JP | 54003797 A * | 1/1979 |
| JP | 56-032154 B2 | 4/1981 |
| JP | 56-032396 Y2 | 4/1981 |
| JP | 57-026086 A | 2/1982 |

(Continued)

*Primary Examiner* — Ajay Vasudeva
(74) *Attorney, Agent, or Firm* — Kelly & Kelley, LLP

(57) ABSTRACT

A device for reducing the drive power requirement of a ship and even for not very quick ships of all types, in particular for slow, wide ships, such as tankers, bulkers and tugboats, and for improving the propeller blower stream as well as for producing a pretwist includes a front nozzle fixedly installed on the hull with fins or hydrofoils placed in the inner space thereof.

4 Claims, 5 Drawing Sheets

FOREIGN PATENT DOCUMENTS

| | | | |
|---|---|---|---|
| JP | 57022994 A | * | 2/1982 |
| JP | 57026086 A | * | 2/1982 |
| JP | 57026087 A | * | 2/1982 |
| JP | 57-158191 A | | 9/1982 |
| JP | 58-004695 A | | 1/1983 |
| JP | 58-016981 A | | 1/1983 |
| JP | 58000492 A | * | 1/1983 |
| JP | 58004695 A | * | 1/1983 |
| JP | 58-139395 U | * | 9/1983 |
| JP | 58-194691 A | | 11/1983 |
| JP | 60-127299 U | | 7/1985 |
| JP | 61-036499 U | | 3/1986 |
| JP | 61-203199 U | | 9/1986 |
| JP | 62-016879 B2 | | 1/1987 |
| JP | 63-173791 A | | 7/1988 |
| JP | 04-043193 A | | 2/1992 |
| JP | 05-185986 A | | 7/1993 |
| JP | 05185986 A | * | 7/1993 |
| JP | 07-267189 A | | 10/1995 |
| JP | 09-175488 A | | 7/1997 |
| JP | 09175488 A | * | 7/1997 |
| JP | 2004074886 A | * | 3/2004 |
| JP | 2004-130908 A | | 4/2004 |
| JP | 2004306839 A | * | 11/2004 |
| JP | 2006-347519 A | | 12/2006 |
| JP | 2006347519 A | * | 12/2006 |
| KR | 1020060108472 A | | 10/2006 |

* cited by examiner

DEVICE FOR REDUCING THE DRIVE POWER REQUIREMENT OF A SHIP

BACKGROUND OF THE INVENTION

Field of the Invention

This invention relates to a device for reducing the drive power requirement of a single or multiple propeller ship.

SUMMARY OF THE INVENTION

The aim of this invention is to create a device which serves for reducing the drive power requirement of a ship.

This aim is achieved by a device which is fixedly installed on the hull in front of the propeller and includes a front nozzle configured rotationally symmetrical about a central axis and fins or hydrofoils having different lengths placed inside the front nozzle.

Accordingly, the device according to the invention for reducing the drive power requirement of a single or multiple propeller ship is configured in such a manner that the device which is fixedly installed on the hull in front of the propeller consists of a front nozzle configured rotationally symmetrical about a central axis and fins or hydrofoils having different lengths placed inside the front nozzle.

Using such a device, it is possible to reduce the drive power requirement of a ship. The possible gain increases with an increasing thrust loading factor of the propeller. The device is appropriate in particular for slow wide ships such as tankers, bulkers and tugboats and even for not very quick ships of all types. The device itself is fixedly installed on the hull in front of the propeller of the ship and consists of the two functional elements front nozzle and fins or hydrofoils.

The working principle of the front nozzle resides in the increase of the propeller velocity in the blower stream in areas with very high co-current and in the reduction of the propeller velocity in blower stream in areas of low co-current and that of the fins or hydrofoils placed within the front nozzle in producing a pretwist, whereby both functional elements aim at different sources of losses, namely the front nozzle at a reduction of the effective thrust load and the fins or hydrofoils at a reduction of the twist losses in the propeller jet. Due to both effects, the efficiency of the propulsion system is increased.

In accordance with a feature of the invention, the front nozzle is configured rotationally symmetrical about a central axis with the upwards offset axle, preferably above the propeller axle, wherein the inner diameter of the front nozzle is maximally 90% of the propeller diameter.

Preferably, four fins or hydrofoils are placed asymmetrically inside the front nozzle and radially to the propeller axle, wherein the fins or hydrofoils having different lengths connect the hull with the front nozzle configured rotationally symmetrical about a central axis and are placed at the rear end of the front nozzle, wherein the vaulted side of the hydrofoil-shaped and also lens-shaped cross-sectional profile of the fin or of the hydrofoil is oriented upwards on the upwardly striking side of the propeller and downwards on the downwardly striking side of the propeller. The arrangement of four fins or hydrofoils having different lengths in the inner space of the front nozzle does not constitute any limitation, all the more since a lower or higher number of fins or hydrofoils having different lengths can also be provided.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
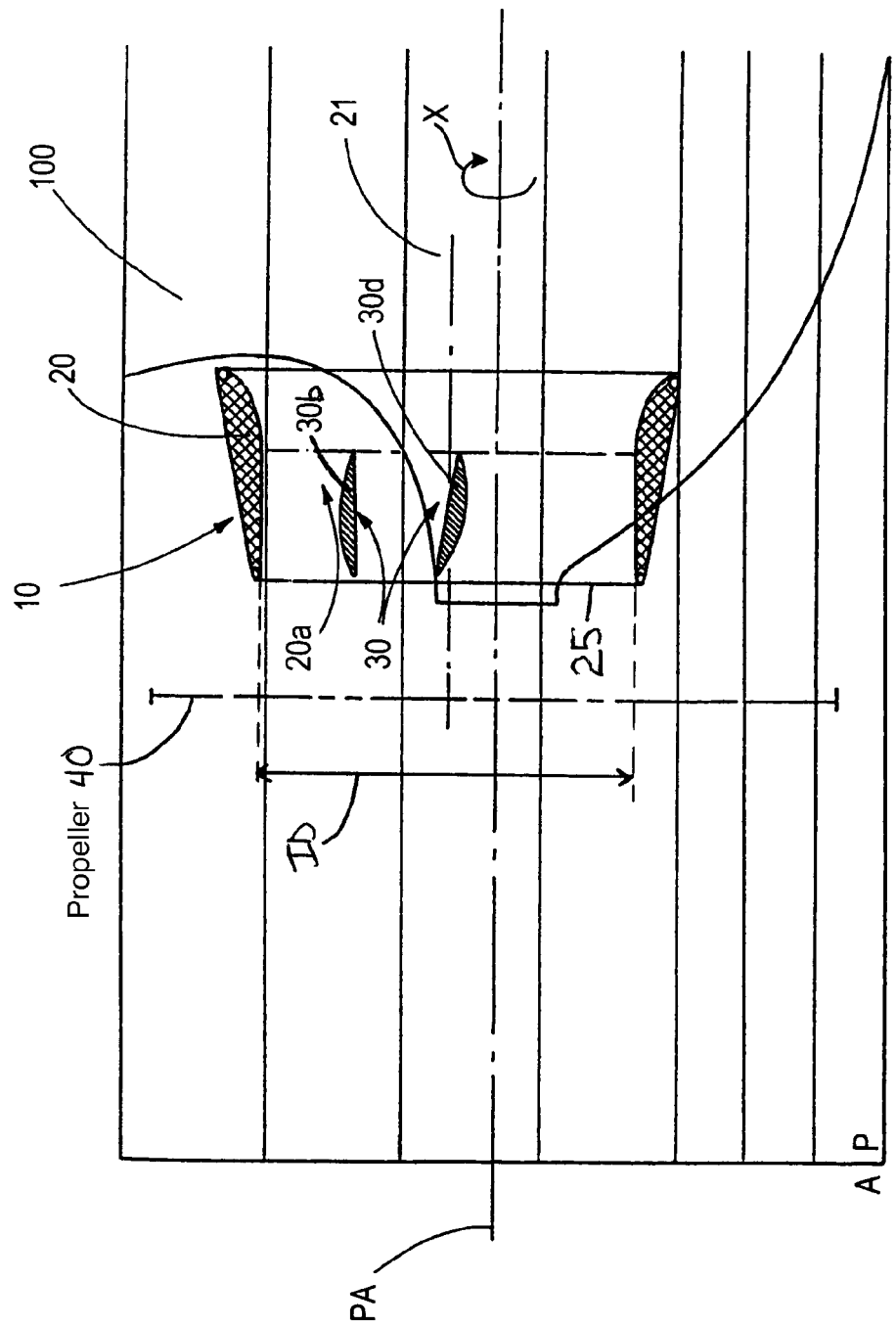
FIG. 1 is a starboard side view of the device according to the invention consisting of a front nozzle with fins or hydrofoils placed in the inner space thereof.

According to FIG. 1, the device 10 for reducing the drive power requirement of a ship consists in that a front nozzle 20 with a cylindrical configuration or a differently configured shape or cross-sectional form is provided directly in front of the propeller (which is not represented on the drawing) of a ship 100, this nozzle being fixedly installed on the hull. Fins or hydrofoils 30 are placed in the inner space 20a of the front nozzle 20. The front nozzle 20 is placed on the hull and is configured rotationally symmetrical about a central axis with an upwards offset axle 21.

Figure 2:
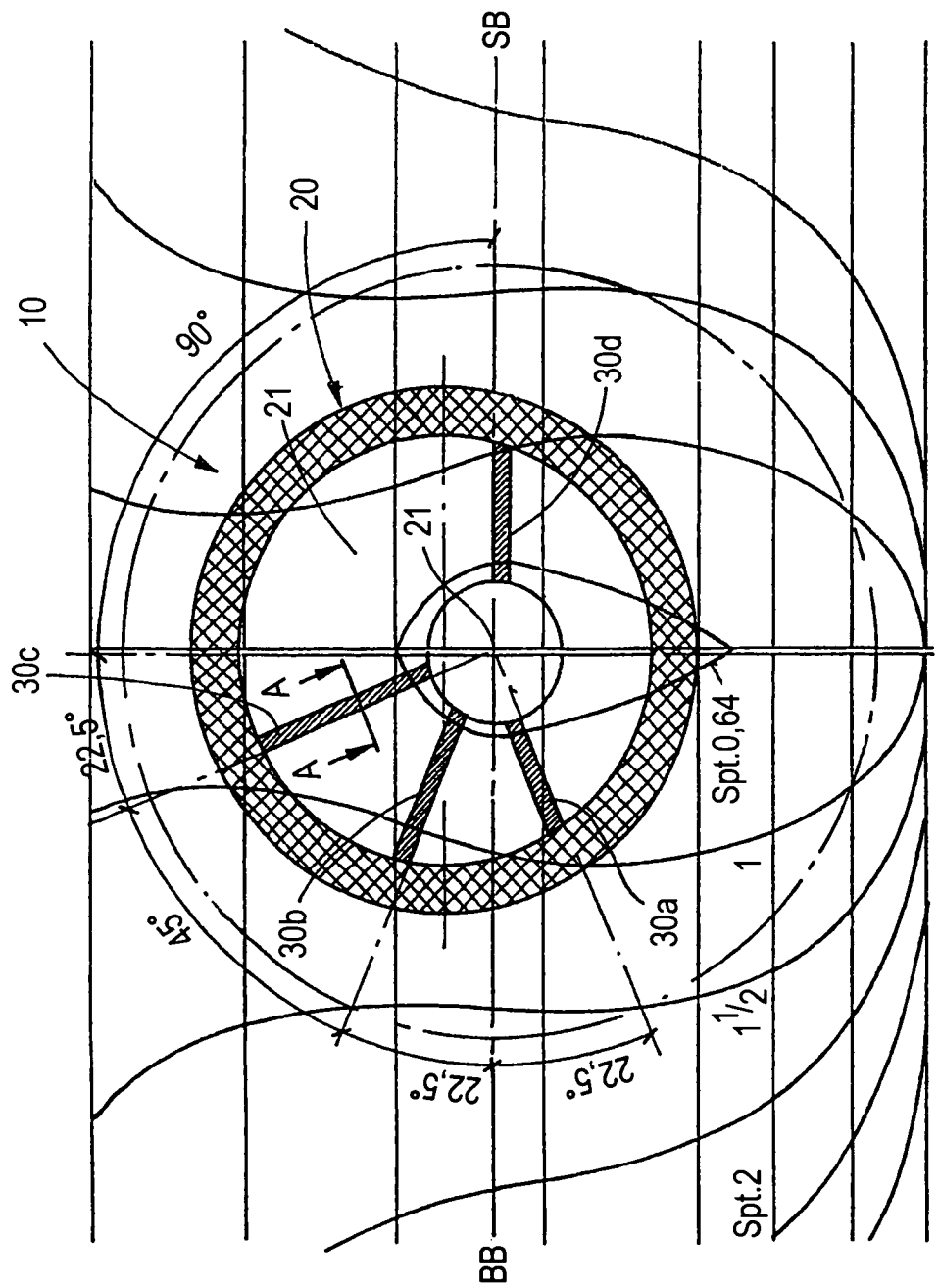
FIG. 2 is a rear view of the device, whereby the fins or hydrofoils are represented being not adjusted.
Figure 3:
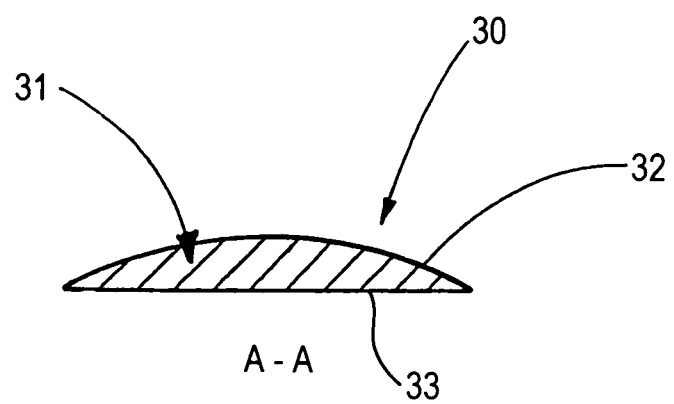
FIG. 3 is an enlarged cross-section through the profile of a fin or of an hydrofoil.
Figure 4:
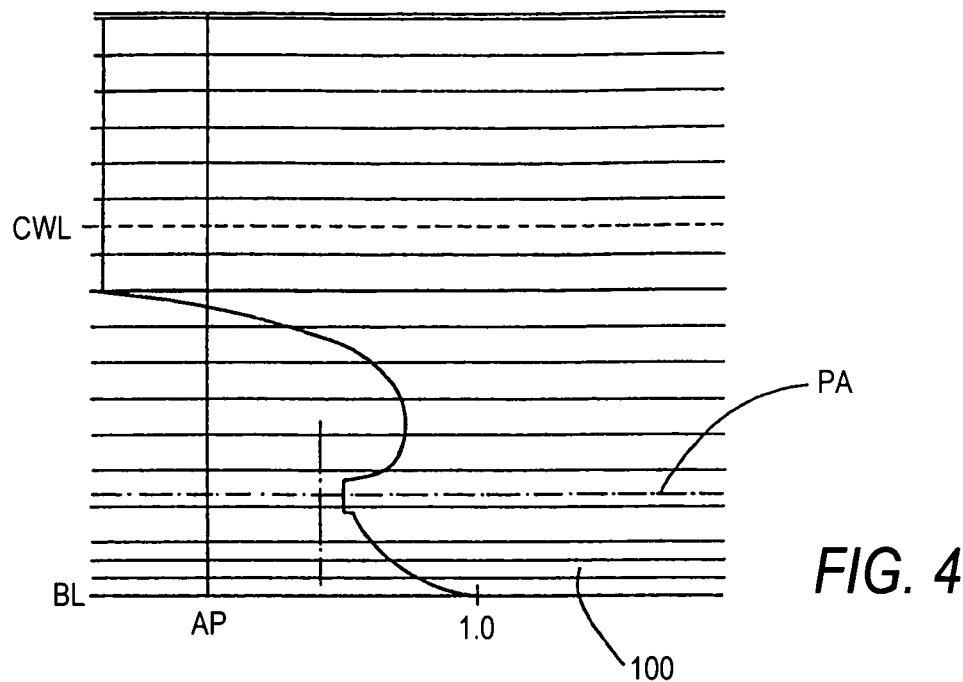
FIG. 4 is a side view of the stern contour.
Figure 5:
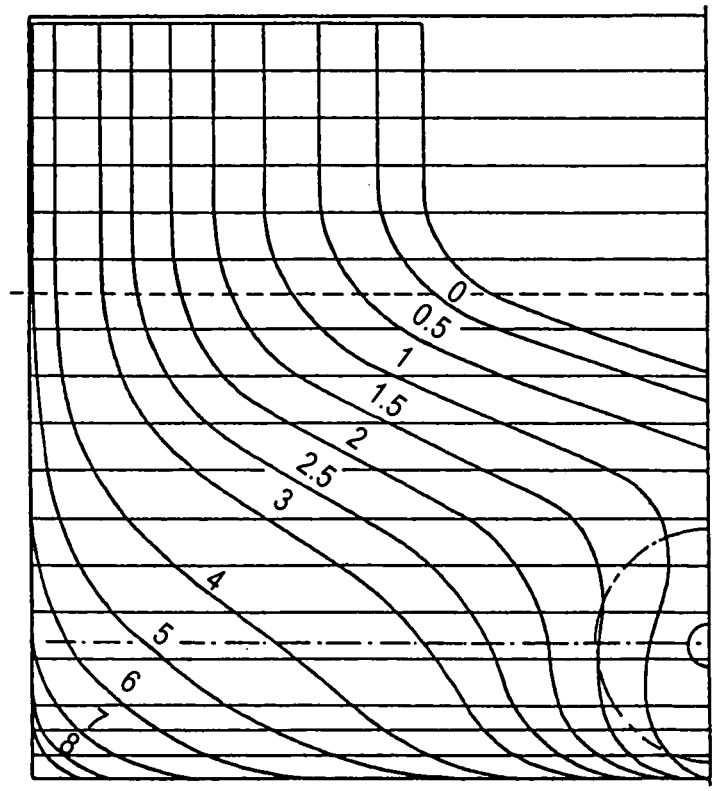
FIG. 5 is a body plan of the after-body.

For the embodiment represented in FIG. 2, four fins or hydrofoils 30a, 30b, 30c, 30d, are placed star-shaped with the fins or hydrofoils having different lengths in the inner space 20a of the front nozzle 20. These four fins or hydrofoils have different lengths and are placed asymmetrically inside the front nozzle and radially to the propeller axle PA. This being, the fins or hydrofoils 30a, 30b, 30c, 30d connect the front nozzle 20 with the hull 100 and are placed at the rear end of the front nozzle 20 which is turned to the propeller, whereby the vaulted side 32 of the hydrofoil-shaped or lentiform cross-sectional profile 31 of the fins or hydrofoils 30, 30a, 30b, 30c, 30c is orientated upwards on the aport side of the ship or on the upwards striking side of the propeller and downwards on the starboard side of the ship or on the downwards striking side of the propeller. Moreover, the fins or hydrofoils 30a, 30b, 30c, 30d are orientated at the front upwards on the aport side and at the front downwards on the starboard side (FIGS. 2 and 3). The sense of rotation of the propeller is in direction of the arrow X (FIG. 1). The fins or hydrofoils 30 or 30a, 30b, 30c, 30d placed in the inner space 20a of the front nozzle 20 are adjustable in their angular positions and lockable in the angular positions which have been set.

According to an embodiment with a propeller 40 rotating upwards to the starboard side, the fins or hydrofoils 30a, 30b, 30c, 30d take on the following preferred radial angular positions and initial angle of attack:

|  |  | Radial angular positions | Angle of attack |
|---|---|---|---|
| Port (BB) | lower fin (30a) | 247.5° | 14° |
| Port (BB) | middle fin (30b) | 292.5° | 12° |

|  |  | Radial angular positions | Angle of attack |
|---|---|---|---|
| Port (BB) | upper fin (30c) | 337.5° | 8° |
| Starboard (SB) | fin (30d) | 90.0° | 10° | namely for a fin angle definition: seen from behind: 12 o'clock=0°, increasing clockwise, whereby the radial angular positions of the fins and the angles of attack can differ from the indicated values.

Figure 6:
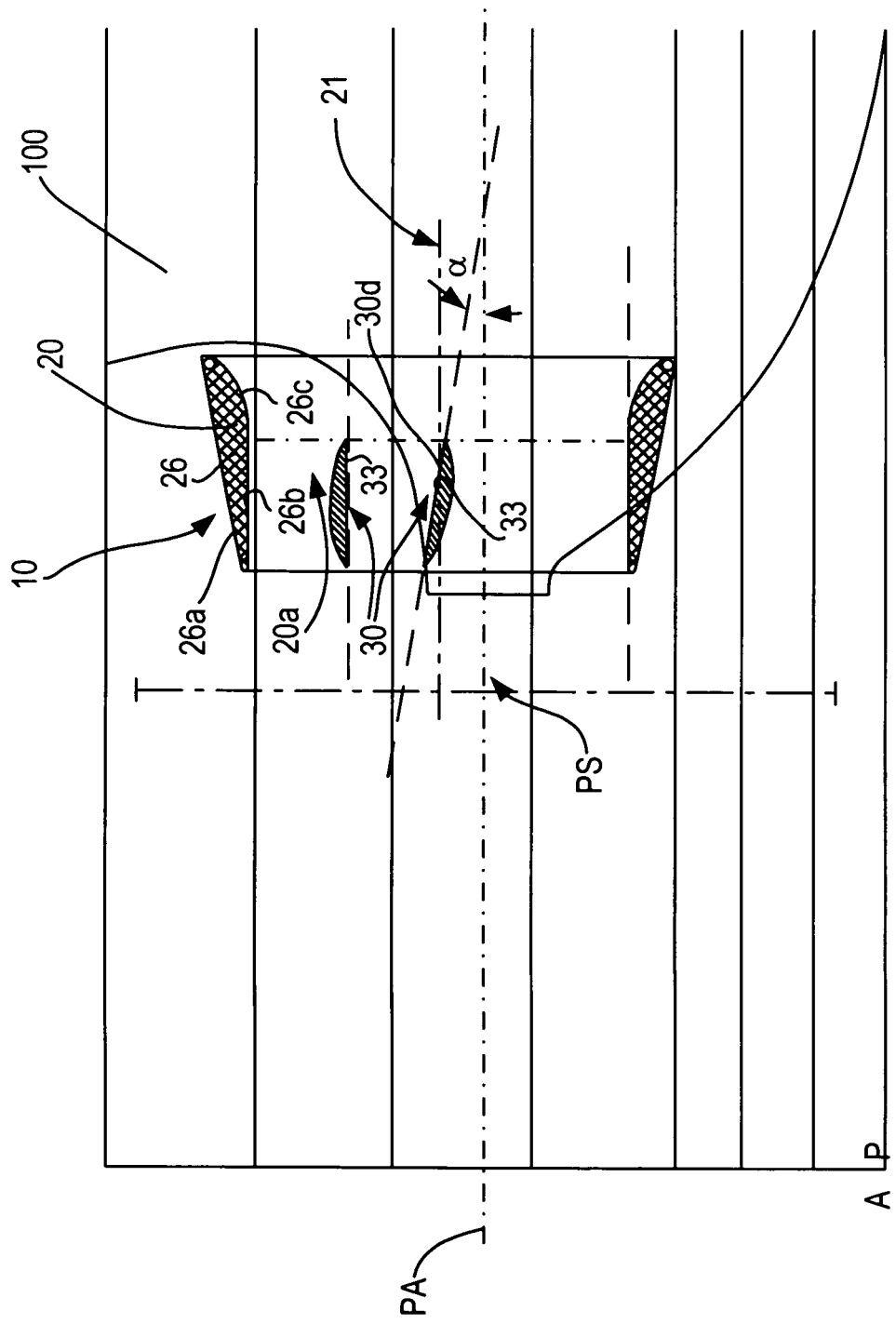
FIG. 6 shows the front nozzle with fins or hydrofoils placed in the inner space thereof according to FIG. 1 with position arrangements of the fins.

According to the embodiment represented in FIGS. 1, 3 and 6, the fins or hydrofoils have different lengths and have a lentiform cross-sectional profile 31 with a vaulted side wall 32 and with a planar side surface 33. The arrangement and the position, for example, of both fins 30 to the propeller axle PA is such that the upper fin is with its side surface 33 approximately parallel to the propeller axle PA, whereas the lower fin takes on a position for which its side surface 33 is in an angle a of at least 5°, preferably of 10° to the propeller axle PA. Other angular positions of the fins are possible. On the whole, the fins 30a, 30b, 30c, 30d have preferably the positions shown in FIG. 2.

The front nozzle 20 according to FIGS. 1 and 6 is formed by a moulded body 25 with a cross-sectional profile 26 with an outside situated wall section 26a which is oblique with an angle to the propeller axis PA and with an inside situated straight wall section which is parallel to the propeller axis PA, this wall section having an arc-shaped wall section 26c in the area turned away from the propeller, this wall section being converted into the outside wall section 26a. The outside situated wall section 26a can also be configured arc-shaped. The propeller side is indicated by PS in FIG. 6.

While specific embodiments of the invention have been shown and described in detail to illustrate the inventive principles, it will be understood that the invention may be embodied otherwise without departing from such principle.

I claim:

1. Device for reducing the drive power requirement of a single or multiple propeller ship, having a hull and a propeller, wherein the device is fixedly installed on the hull in front of the propeller, the device comprising:

a front nozzle and fins or hydrofoils placed inside an inner space of the front nozzle, wherein the front nozzle has an inner diameter no greater than 90% of the propeller diameter and wherein the front nozzle is configured rotationally symmetrical about a central axis, said axis being offset above a propeller axis, wherein the fins or hydrofoils are placed at the rear end of the front nozzle, wherein said fins or hydrofoils are placed asymmetrically in the inner space of the front nozzle and radially with respect to the propeller axis, and wherein said fins or hydrofoils have different lengths.

2. Device for reducing the drive power requirement of a single or multiple propeller ship, having a hull and a propeller, wherein the device is fixedly installed on the hull in front of the propeller, the device comprising:

a front nozzle and fins or hydrofoils placed inside an inner space of the front nozzle, wherein the front nozzle has an inner diameter no greater than 90% of the propeller diameter and wherein the front nozzle is configured rotationally symmetrical about a central axis, said axis being offset above a propeller axis, wherein said fins or hydrofoils are placed asymmetrically in the inner space of the front nozzle and radially with respect to the propeller axis, and wherein said fins or hydrofoils have different lengths, wherein the fins or hydrofoils assume the following radial angular positions and angles of attack:

|  |  | Radial angular positions | Angle of attack |
|---|---|---|---|
| Port (BB) | lower fin (30a) | 247.5° | 14° |
| Port (BB) | middle fin (30b) | 292.5° | 12° |
| Port (BB) | upper fin (30c) | 337.5° | 8° |
| Starboard (SB) | fin (30d) | 90.0° | 10°. |

3. Device for reducing the drive power requirement of a single or multiple propeller ship, having a hull and a propeller, wherein the device is fixedly installed on the hull in front of the propeller, the device comprising:

a front nozzle and fins or hydrofoils placed inside an inner space of the front nozzle, wherein the front nozzle has an inner diameter no greater than 90% of the propeller diameter and wherein the front nozzle is configured rotationally symmetrical about a central axis, said axis being offset above a propeller axis, wherein said fins or hydrofoils are placed asymmetrically in the inner space of the front nozzle and radially with respect to the propeller axis, and wherein said fins or hydrofoils have different lengths, wherein said fins or hydrofoils have a lentiform cross-sectional profile with a vaulted side and a planar side, and the propeller has an upwards striking side and a downwards striking side corresponding to the direction of rotation of the propeller.

4. Device according to claim 3, wherein the fins or hydrofoils connect the hull with the front nozzle and are placed at the rear end of the front nozzle, wherein the vaulted side of the fin or hydrofoil is oriented upwards on the upwards striking side of the propeller and downwards on the downwards striking side of the propeller.

\* \* \* \* \*